United States Patent [19]

McLennan

[11] 4,273,487
[45] Jun. 16, 1981

[54] CARGO TIE-DOWN ANCHOR

[75] Inventor: Richard E. McLennan, Rancho Palos Verdes, Calif.

[73] Assignee: Satron, Inc., El Segundo, Calif.

[21] Appl. No.: 47,989

[22] Filed: Jun. 13, 1979

[51] Int. Cl.³ .................... B60P 7/08; B61D 45/00
[52] U.S. Cl. ................................................. 410/105
[58] Field of Search ............. 410/104, 105, 112, 113, 410/115

[56] References Cited

U.S. PATENT DOCUMENTS

| 3,422,508 | 1/1969 | Higuchi | 410/105 |
| 3,696,759 | 10/1972 | Parris | 410/105 |

Primary Examiner—Richard A. Bertsch
Attorney, Agent, or Firm—Smyth, Pavitt, Siegemund & Martella

[57] ABSTRACT

An anchor of the butterfly type for selectively connecting a strap, rope, chain, cable, or other device to a slotted cargo track includes two identical halves unattached to each other. Each half includes a back plate from which a foot extends under a flange on the track. The back plate is thicker than the foot. In one embodiment, lateral motion of the anchor within the track is limited by the edges of the slot in the track, while in another embodiment lateral motion of the anchor within the track is limited by contact of the toe of the foot against an undercut portion of the track underlying one of the flanges of the track. A pedestal arising from the foot engages one of the concave portions of the edge of a flange of the track to limit movement of the anchor along the track.

12 Claims, 13 Drawing Figures

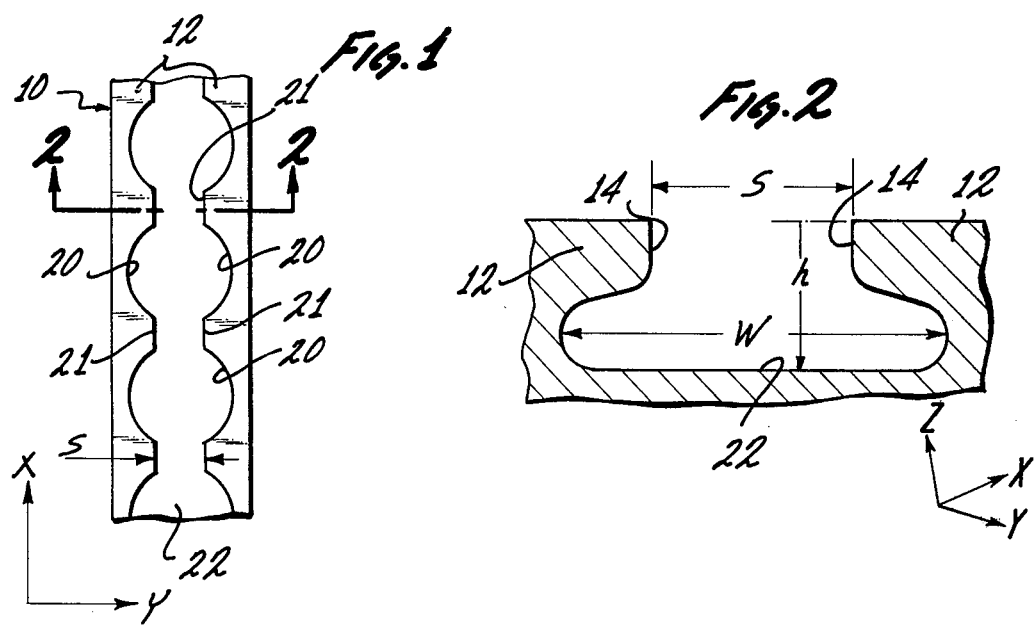

CARGO TIE-DOWN ANCHOR

BACKGROUND OF THE INVENTION

1. Field of the Invention

The present invention relates to a tie-down anchor which is a fitting used to provide a point of attachment for a strap, belt, rope, chain, cable, or other device, and which can be positioned at a selected location along a fixed track.

Tie-down anchors of the type disclosed herein find advantageous use in connection with cargo handling equipment for securing the cargo to a track mounted on a pallet or on a fixed structural portion of an aircraft, ship, train, truck, or other transport vehicle.

2. The Prior Art

A well known technique in the art is to mount a track to a pallet on which cargo is to be secured or to a structural member of a vehicle on which cargo is to be transported, to provide a plurality of positions at which fittings can be attached to the track to permit straps, cables, etc. to be connected to the track to hold the cargo in its intended place. A particular type of track, as shown in U.S. Pat. No. 4,020,770 of May 3, 1977 has become more or less standard throughout the industry.

The present invention is well suited for use with this type of track, but definitely is not limited to use with such track.

A variety of tie-down anchors is known in the prior art and that shown in U.S. Pat. No. 4,020,770 is typical of a family of anchors known in the prior art. The anchors in this family all include more than two parts having specialized shapes and requiring careful assembly. As will be seen below, the anchor of the present invention is far simpler in its structure than any of the members of this family and can easily be distinguished from anchors of this family. There are a number of U.S. patents which describe anchors of the family of anchors describe.

An altogether different, and more pertinent, family of fasteners is that, often referred to as "butterfly fasteners"; all consist of a pair of identical parts which are inserted back-to-back into a track. One such anchor is that manufactured by Aeroquip Corporation of Jackson, Mich. That anchor is designed for use with a type of track which is used in the trucking industry, but the anchor will not fit into the standard cargo track previously referred to.

Each half of the Aeroquip fitting includes a foot which extends perpendicular to the portions of the fitting through which the belt passes. The soles of the feet are positioned toward each other and the feet are then extended through one of the holes in the track. Thereafter, the belt-receiving portions are brought together, causing the feet to pivot away from each other.

Another, and more pertinent, member of this second family of anchors is shown in FIGS. 8 and 9. This fitting described in U.S. Pat. No. 3,422,508 issued Jan. 21, 1969 to Higuchi. This fitting also consists of two identical parts positioned back-to-back. Unlike the Aeroquip fitting, Higuchi's fitting, is intended for use with a cargo track of the type previously describe.

Higuchi's contemplates that his fitting is to be made of a single formed plate of metal. Such a design is unacceptable to the industry because the width of the opening in the track between the extending projections is greater than twice the thickness of the opening receiving the foot of the stud. As shown in the Higuchi patent, and the back portions 16, 17 of his plates, which extend perpendicularly out of the track, do not serve—after insertion—to keep the halves positioned in the track, because they are too thin, being of the same thickness as the foot portion, and the halves fall out of the track in use. Higuchi provides devices such as a looped strap, hinged clip, and insertable pin to hold the plates together so they will not fall out. Such structures require extra steps to apply, are susceptible to damage, and may become lost if not attached.

These auxiliary structures are dispensed with in the present invention, in which the back portion is thicker than the foot portion so that when the two halves are inserted back-to-back in the track, the space between the straight portions of the slot of the track is largely filled by the back portions of the halves, so that in a preferred embodiment, lateral movement of the anchor within the track is limited by contact of the back portions with the straight portions of the edge of the flange of the track.

SUMMARY OF THE INVENTION

In a preferred embodiment, the anchor of the present invention includes two halves; each of these halves is a structure including a back plate, a foot, and a land extending from the foot. When the anchor is installed in the track, the foot extends under the flange of the track, the back plate extends perpendicularly outward from the track, and the land engages the curved edge of the slot to prevent the half from moving longitudinally along the track. In the preferred embodiment, the land is a raised area on the foot, and the land abuts the back plate. The back plate includes an aperture through which a strap, a cable, or coupling attachment can be passed.

In the present invention, the back plate is thicker than the foot, and in addition to keeping the anchor positioned in the track in a preferred embodiment, the thick back plate augments the strength of the anchor.

The anchor of the present invention in inserted into the track by bringing the two halves together with the soles of their feet toward each other and with their back plates angled away from each other. The feet are then inserted into the slot of the track, and the halves are then pivoted in opposite senses about longitudinal axes to bring the back plates into contact, and to insert the foot into the space under the flange of the track. The industry prefers that once the anchor has been thus inserted into the track, it must not fall out readily. Because of the thickness of the back plate relative to the opening between the straight edges of the flange of the track, the anchor of the present invention fits within the track sufficiently closely that it has practically no tendency to fall out of the track in normal usage.

The novel features which are believed to characterize the invention, both as to its structure and method of use, together with further objects and advantages thereof, will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a plan view of a standard type of track used in the cargo transport industry and similar to that specified by Military Standard 33601A;

FIG. 2 is a cross-sectional view of the track of FIG. 1 in the direction 2—2 indicated in FIG. 1;

DETAILED DESCRIPTION OF THE PREFERRED EMBODIMENT

Figure 4:
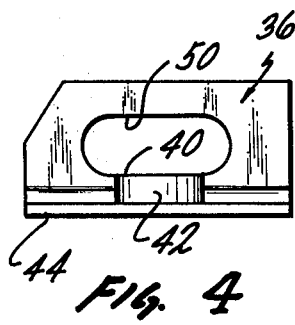
FIG. 4 is a side elevation view of the preferred embodiment of the present invention.
Figure 5:
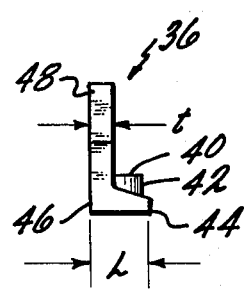
FIG. 5 is an end elevation view of a preferred embodiment of the anchor of the present invention.

Turning now to the drawings in which like parts are denoted by the same reference numeral throughout, there is shown in FIGS. 1-2 a slotted cargo track 10 of the type specified by Military Standard 33601A. It is this type of track with which the preferred embodiment of the present invention is intended to be used. As shown in FIGS. 1-2, the track includes a pair of spaced undercut longitudinally extending flanges 12. The flanges have edges 14 which face each other and the edges include concave portions 20 alternating with straight portions 21 along the track in a periodic sequence. The direction along the track is referred to throughout as the longitudinal direction X, while the direction across the track is referred to as the lateral direction Y. A third direction, orthogonal to X and Y and extending out of the track is referred to as the vertical direction Z. As shown in FIG. 2, the undercut flanges 12 partially define a longitudinally-extending hollow space of uniform reentrant lateral cross section. The symbol W will be used to denote the total width of the hollow space in the lateral direction, and the symbol S will be used to denote the total space between the straight portions 21 of the flanges 12. The floor 22 of the hollow space is substantially flat.

Figure 3:
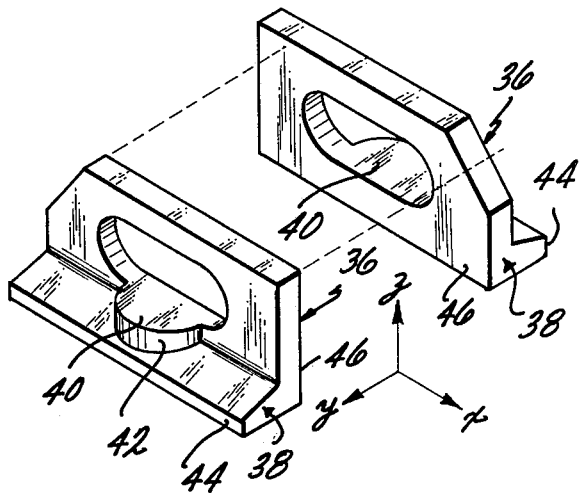
FIG. 3 is a perspective view of a preferred embodiment of the present invention.

A preferred embodiment of the anchor of the present invention is shown in FIGS. 3-7. As seen in FIG. 3, the anchor includes two unattached halves, each half being a rigid unitary structure extending in longitudinal, lateral, and vertical directions xyz which will be aligned with the longitudinal, lateral, and vertical directions XYZ of the track when the halves have been inserted into the track. In addition to the back plate 36, each half includes a foot 38 and a land 40 which is supported by a pedestal 42. The foot 38 includes a toe 44 and a heel 46. The lateral distance between the toe 44 and the rear side 48 of the back plate 36, denoted in FIG. 5 as L, is less than one half the lateral width W of the hollow space within the track shown in FIG. 2. The vertical thickness of the foot is small enough to permit the toe 44 to extend into the undercut space beneath one of the flanges 12 of the track, to prevent the half from being pulled vertically out of the track. The thickness of the back plate 36, denoted in FIG. 5 as t is greater than the vertical thickness of the foot. The thickness t of the back plate 36 must be less than half the space S shown in FIG. 2 between the edges 14 of the flanges 12 of the track 10 to permit the halves to be inserted and removed from the track. In the preferred embodiment, the clearance is relatively small, so that lateral movement of the inserted anchor within the track is limited by the straight portions 21 of the track in the preferred embodiment.

In an alternative embodiment, the lateral distance between the rear side 48 of the back plate 36 and the tip of the toe 44 is less than half the width W of the hollow space within the track by an amount of clearance sufficiently small that when the anchor has been inserted into the track, lateral movement of the anchor is limited by contact of the toe 44 with the lateral extremity of the hollow space inside the track.

In other embodiments, the heel 36 is rounded, while in still other embodiments, the sole of the foot adjacent the toe 44 may be curved upwardly. These variations in shape in the alternative embodiments facilitate insertion and removal of the halves when the thickness t of the back plate 36 is nearly equal to half the space S between the edges 14 of the flanges 12.

In the preferred embodiment, the land surface 40 is elevated above the upper surface of the foot 38 and is supported by the pedestal 42 which extends vertically from the foot 38 with which it is integral. In accordance with the present invention, the pedestal 42 extends laterally toward the toe 44 sufficiently far to engage one of the concave portions 20 of the track 10 when the half has been inserted into the track. Thus, in accordance with the present invention the pedestal 42 serves merely to limit the motion of the anchor along the track in the longitudinal direction.

Figure 6:
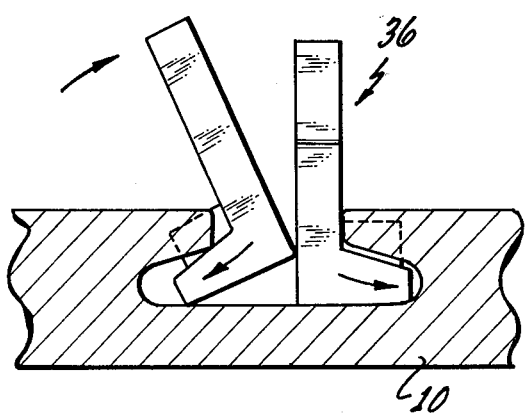
FIG. 6 is a diagrammatic end view showing how the anchor of the present invention is inserted into the track.

FIG. 6 illustrates the way in which the halves are inserted into the track 10. The halves are removed from the track by reversing the motion by which they were inserted.

Figure 7:
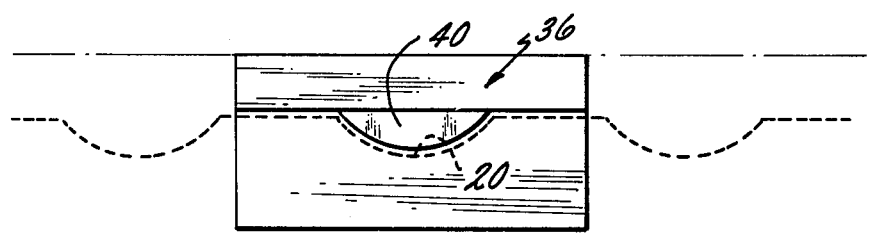
FIG. 7 is a plan view of the preferred embodiment of the anchor of the present invention shown in the FIGS. 3-5.
Figure 8:
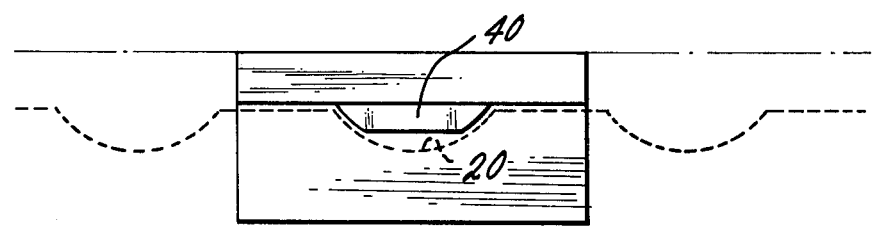
FIG. 8 is a plan view showing an alternative embodiment of the present invention wherein the land is truncated.
Figure 9:
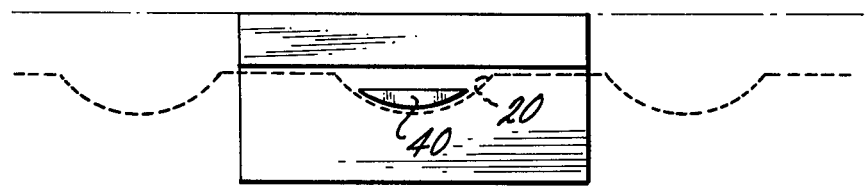
FIG. 9 is a plan view of an alternative embodiment of the present invention in which the land is spaced from the back plate.
Figure 10:
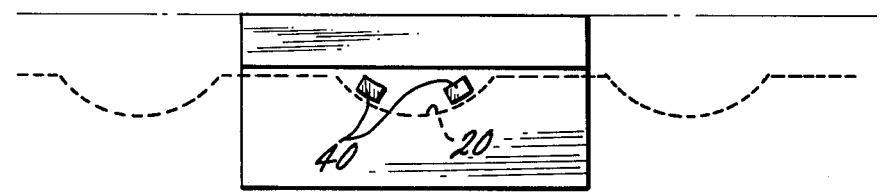
FIG. 10 is a plan view of an alternative embodiment of the present invention in which two small lands are used.
Figure 11:
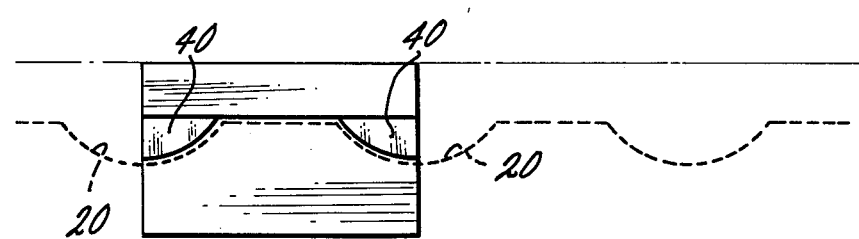
FIG. 11 is an alternative embodiment of the present invention in which two lands are located at opposite ends of the anchor.
Figure 12:
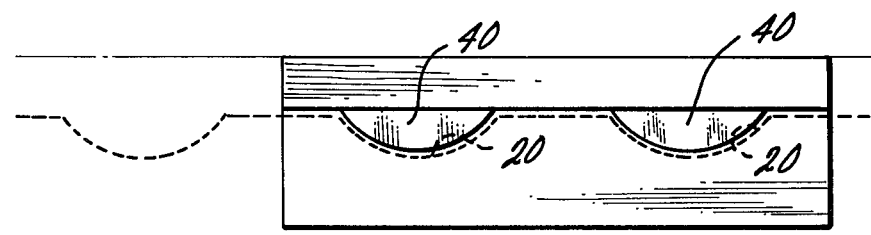
FIG. 12 is a plan view of an alternative embodiment of the present invention intended for heavy-duty applications; and, FIG. 13 is an end elevation view of an alternative embodiment.

FIG. 7 is a plan view showing the land 40 and the manner in which it cooperates with the concave portion 20 of the track, shown in dashed lines, to limit longitudinal motion of the anchor along the track. FIGS. 8-11 show alternative embodiments which illustrate various configurations of the land 40. From FIG. 11 it is clear that the location of the land 40 longitudinally on the foot 38 is not crucial in the present invention. FIG. 12 shows an alternative embodiment of double length for use in heavy duty applications.

Figure 13:
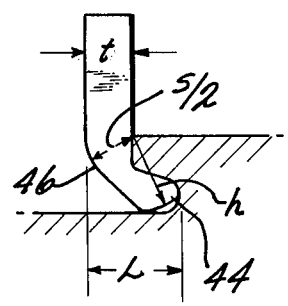

FIG. 13 shows an alternative embodiment in which the heel 46 is rounded and a portion of the sole adjacent the toe is curved upwardly to facilitate insertion and removal of the anchor.

It is clear that in all of the embodiments of the present invention, the back plate 36 can be provided with an aperture 50 through which a strap, cable, or other device can be passed. It is also clear that although the anchor has been described in the context of its use with a type of track defined by Military Standard Specification 33601A, suitable design modifications would permit the anchor to be used with tracks that are generally similar to but not identical with the standard track.

Thus, there has been described an anchor which is stronger and of simpler construction than anchors previously known in the art. The foregoing detailed description illustrates several embodiments of the invention, but it will be understood that additional embodiments thereof will be obvious to those skilled in the art. The embodiments described herein together with those additional embodiments are considered to be within the scope of the invention.

What is claimed is:

1. An end fitting for cargo tiedown gear for connecting the cargo tiedown gear to a tiedown track wherein the track includes having a pair of spaced undercut longitudinally-extending flanges, a longitudinally-extending hollow space of uniform reentrant lateral cross section defined beneath the flanges and within the track, the hollow space having a uniform width in the lateral direction, said flanges including edges which face each other, the edges including opposite straight portions alternating along the edge with opposing concave portions in a periodic sequence, said end fitting being of the butterfly type wherein two halves of the end fitting are juxtaposed at a position along the track and are inserted into the track by simultaneously pivoting the halves in opposite senses about longitudinal axes, said end fitting comprising:

two halves, each half being a rigid unitary structure extending in longitudinal and lateral directions that are aligned with the longitudinal and lateral directions of the track when the halves have been inserted into the track, and extending in a vertical direction that is orthogonal to the longitudinal and lateral directions, each half comprising:

a foot having a toe, a heel and sole, said foot thin enough in the vertical direction to permit the toe to extend into the undercut space beneath one of the flanges of the track to prevent the half from being pulled vertically out of the track;

said toe being thinner in a vertical direction than the remainder of said foot;

a back plate extending longitudinally and extending vertically from the heel of the foot far enough to extend outward and beyond the flanges when the half has been inserted in the track, the thickness of said back plate in the lateral direction being greater than the thickness of the foot in the vertical direction, the thickness of said back plate being less than half the lateral spacing between the straight portions of the edges of the flanges of the track by an amount of clearance adequate to permit the halves to be pivoted into the track but sufficiently small that after the halves have been inserted into the track, lateral motion of the end fitting within the track is limited by the straight portions of the edges of the flanges of the track;

a land elevated vertically above said foot and supported by a pedestal extending vertically from said foot, said pedestal extending laterally toward the toe of the foot far enough to engage one of the concave portions of the edge of a flange of the track when said half has been inserted into the track, to limit movement of said half longitudinally along the track; and, each of said two halves including means for securing to said two halves cargo tiedown gear when said two halves are inserted in said track.

2. The end fitting of claim 1 wherein said back plate includes an aperture which forms the means for securing cargo tiedown gear thereto.

3. The end fitting of claim 1 wherein the heel of said foot is rounded.

4. The end fitting of claim 1 wherein the heel of said foot is beveled.

5. The end fitting of claim 1 wherein a portion of the sole of said foot curves upward toward the toe of said foot.

6. The end fitting of claim 1 wherein said two halves are identical in size and shape.

7. An end fitting for selectively connecting a strap, rope, chain, cable, or other device to a slotted cargo track of the type having a pair of spaced undercut longitudinally-extending flanges, a longitudinally-extending hollow space of uniform reentrant lateral cross section defined beneath the flanges and within the track, the hollow space having a uniform width in the lateral direction, said flanges including edges which face each other, the edges including opposing straight portions alternating along the edge with opposing concave portions in a periodic sequence, said end fitting being of the butterfly type wherein two halves of the end fitting are juxtaposed at a position along the track and are inserted into the track by simultaneously pivoting the halves in opposite senses about longitudinal axes, said end fitting comprising:

two halves, each half being a rigid unitary structure extending in longitudinal and lateral directions that are aligned with the longitudinal and lateral directions of the track when the halves have been inserted into the track, and extending in a vertical direction that is orthogonal to the longitudinal and lateral directions, each half comprising:

a foot having a toe, a heel and a sole, said foot thin enough in the vertical direction to permit the toe to extend into the undercut space beneath one of the flanges of the track to prevent the half from being pulled vertically out of the track;

a back plate extending longitudinally and extending vertically from the heel of the foot far enough to extend outward between and beyond the flanges when the half has been inserted in the track, the thickness of said back plate in the lateral direction being greater than the thickness of the foot in the vertical direction, the lateral distance between the toe and the surface of the back plate farthest from the toe being less than half the uniform lateral width of the hollow space but sufficiently great that after the halves have been inserted into the track, lateral motion of the anchor within the track is limited by contact of the toes with the lateral boundaries of the hollow space, and, a land elevated vertically above said foot and supported by a pedestal extending vertically from said foot, said pedestal extending laterally toward the toe of the foot far enough to engage one of the concave portions of the edge of a flange of the track when said half has been inserted into the track, to limit movement of said half longitudinally along the track.

8. The end fitting of claim 7 wherein said back plate further includes an aperture for connection thereto of said strap and the like.

9. The end fitting of claim 7 wherein the heel of said foot is rounded.

10. The end fitting of claim 7 wherein the heel of said foot is beveled.

11. The end fitting of claim 7 wherein a portion of the sole of said foot curves upward toward the toe of said foot.

12. The end fitting of claim 7 wherein said two halves are identical in size and shape.

* * * * *